Aug. 20, 1968  J. C. STEINER ET AL  3,397,533
HOT GAS ENGINE CONTROL SYSTEM

Filed Oct. 7, 1966  2 Sheets-Sheet 1

INVENTORS
John C. Steiner &
James H. Wolgemuth

David A. Greenlee
ATTORNEY

United States Patent Office 3,397,533
Patented Aug. 20, 1968

3,397,533
HOT GAS ENGINE CONTROL SYSTEM
John C. Steiner, Warren, and James H. Wolgemuth,
Ypsilanti, Mich., assignors to General Motors Corporation, Detroit, Mich., a corporation of Delaware
Filed Oct. 7, 1966, Ser. No. 585,144
8 Claims. (Cl. 60—24)

ABSTRACT OF THE DISCLOSURE

A closed cycle hot gas engine heated by a flow of gas through a thermal energy storage tank to a heat exchanger and having working gas storage means arranged to supply gas to and receive gas from the engine working and buffer chambers. Power is controlled by filling and dumping gas from the engine working chamber. A control system includes means limiting the minimum heater temperature to that at which maximum power is obtained, means limiting the maximum heat exchanger temperature to prevent its failure and means permitting bypassing of gas between the working and buffer chambers to reduce power during the dumping of gas to the gas storage means.

---

This invention relates generally to closed cycle hot gas engines and more specifically to a control system for controlling the operation of a Stirling cycle hot gas engine.

The performance characteristics, such as power output and efficiency, of a Stirling engine vary with the engine energy input, with the pressure of the engine internal working gas, and with engine speed. Engine power is proportional to the product of engine speed and torque. Torque varies as a function of engine working gas pressure. If the external supply of thermal energy made available to the engine heater is substantially constant, power varies proportionally with torque and is therefore dependent upon the working gas pressure for a given engine speed. Thus engine performance may be controlled by selectively varying the engine working gas pressure.

The illustrative embodiment shows a conventional coaxial piston, rhombic drive Stirling engine coupled to a thermal energy storage system which supplies thermal energy to the engine heater by means of external recirculating heating gas. The engine working and buffer spaces are interconnected by working gas bypass means and are connected to gas storage means. Means are provided for selectively varying the engine working gas pressure.

In this engine, if the external heating gas is supplied to the engine heater at a constant temperature and a constant mass flow rate, an increase in the pressure of the internal working gas results in a decrease in the temperature of the engine heater for a given engine speed. This decrease in heater temperature effects an increased rate of heat transfer from the heating gas to the working gas in the engine heater because of a greater temperature differential between the heating gas and the working gas. This results in a change in engine torque and, for a given engine speed, a change in power output.

To obtain optimum performance from this engine, the working gas pressure must be controlled so that the engine operates within a corresponding optimum temperature range. This temperature range is limited by a minimum temperature coincident with maximum torque and by a maximum temperature determined by the thermal design characteristics of the engine heater. This invention provides a control system for automatically controlling the engine to operate within the optimum temperature range with independently varying torque and speed.

One feature of this invention is that means are provided for regulating the engine working gas pressure in response to engine heater temperature. Another feature is that the gas pressure regulating means are responsive to a fall in heater temperature below a predetermined minimum sensed by a heater temperature sensing device to limit the supply of working gas to the engine.

Yet another feature is that means are provided for regulating the supply of thermal energy to the engine in response to engine heater temperature. Still another feature is that the thermal energy regulating means are responsive to a rise in heater temperature above a predetermined maximum sensed by the heater temperature sensing device to limit the supply of thermal energy to the engine.

A further feature is that means responsive to the gas pressure in the gas storage means are provided to regulate the transfer of working gas between the working and buffer spaces to control the engine during maximum gas dumping conditions.

Further features of this invention will become readily apparent upon reference to the following detailed description of the attached drawings in which.

Figure 4:
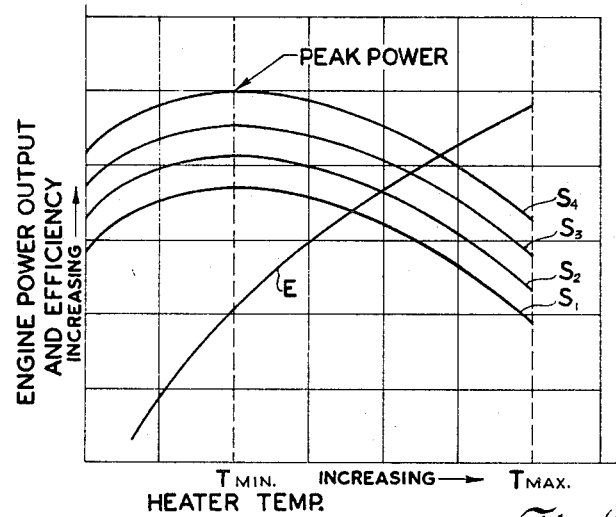
Figure 5:
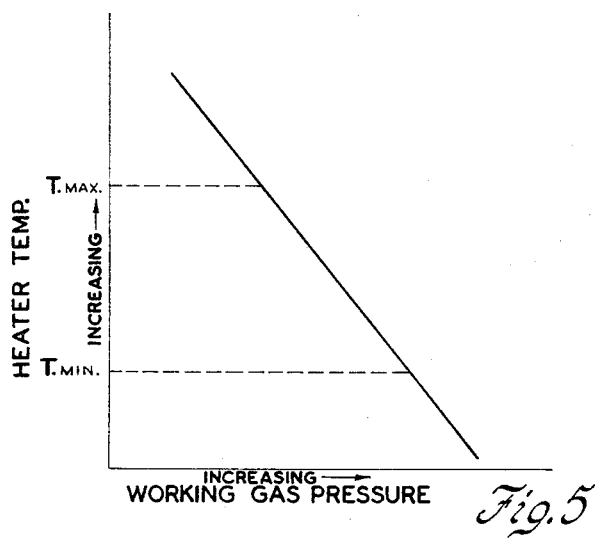

FIGURE 4 is a graph showing engine power and efficiency as a function of engine heater temperature with engine speed as a parameter and for a constant supply temperature and mass flow rate of the heating gas; and FIGURE 5 is a graph showing engine heater temperature as a function of working gas pressure at a constant engine speed and for a constant supply temperature and mass flow rate of the heating gas.

Figure 1:
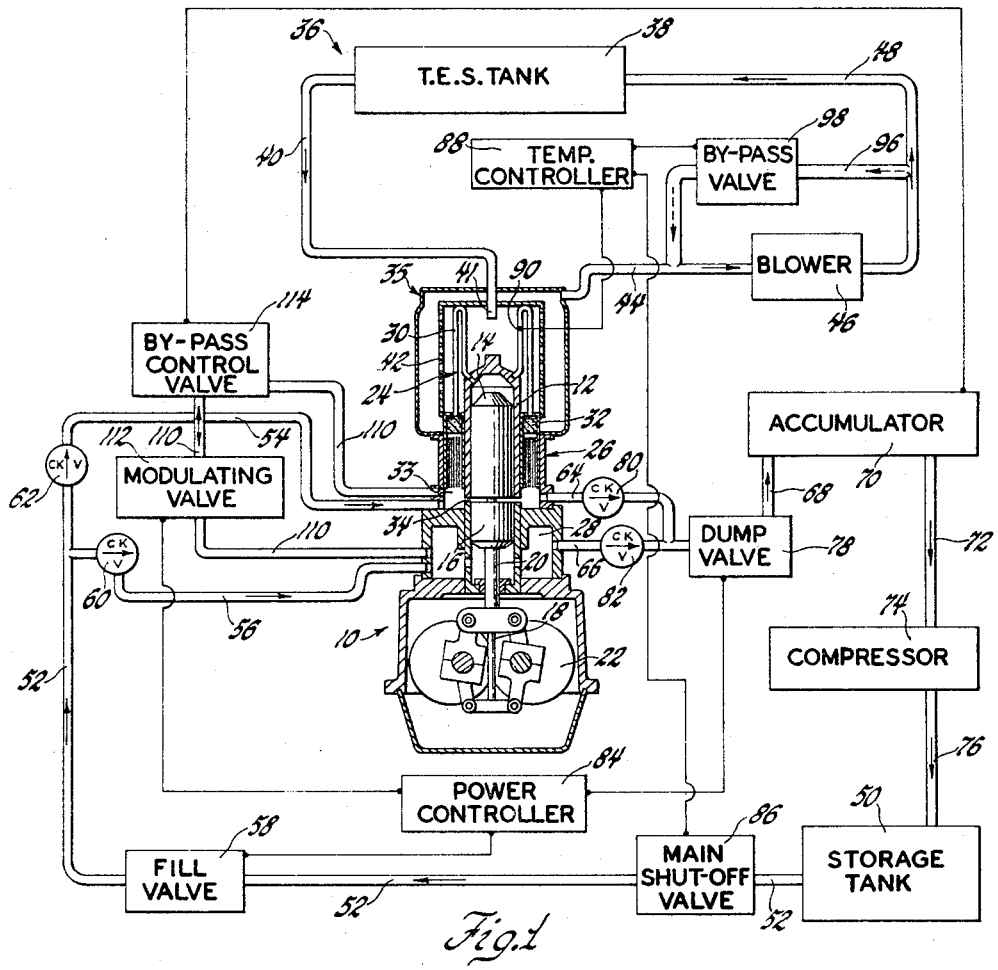
FIGURE 1 is a schematic diagram of a Stirling engine employing a control system according to this invention.

Referring now to FIGURE 1 of the drawings, a Stirling engine is generally indicated at 10. Although any Stirling engine may be used, a modified 30 horsepower model 30–15, produced by N. V. Philips Gloeilampenfabrieken, Eindhoven, Netherlands, is shown for illustrative purposes. The engine includes a working space or cylinder 12 having a displacer piston 14 and a power piston 16 reciprocable therein. The power and displacer pistons are connected by respective concentric connecting rods 18 and 20 to a rhombic drive mechanism 22 of the type shown in United States Patent No. 3,077,732, Reinhart et al. The engine 10 includes gas heating means in the form of a high temperature heat exchanger or heater 24, a plurality of annularly arranged low temperature heat exchangers or coolers 26 and a buffer space 28.

Heater 24 comprises a plurality of annularly arranged heater tubes 30 each connected at one end to the upper portion of cylinder 12. A regenerator 32 interconnects each heater tube 30 and a cooler 26. Coolers 26 are connected to cylinder 12 by a plurality of annularly arranged chambers 33 and ports 34. The fluid system preferably utilizes hydrogen as a working gas, although any other suitable gas may be used. As is well known in the art, the rhombic drive mechanism 22 phases the operation of the displacer and power pistons so that the working gas is moved from heater 24 to coolers 26 where it is compressed, and moved back to heater 24 where it is expanded.

The means for heating the working gas in engine 10 comprise heater 24, a heater manifold system 35 and a thermal energy storage system, generally designated 36, which supplies thermal energy through manifold system 35 to heater 24. The thermal energy storage system 36 will be described only to the extent necessary to a full understanding of the invention. A more detailed description of such a thermal energy storage system may be found in SAE Paper #608B, "Power From Thermal Energy Storage Systems," by G. Flynn, Jr., W. H. Percival and M. Tsou, October 29–November 1, 1962.

The storage system 36 includes a thermal energy storage means in the form of a tank 38 filled with a suitable storage medium, such as alumina pellets, which are heated by suitable means, such as a gaseous or liquid fuel burner, not shown, to store thermal energy. A suitable heating gas, such as air or nitrogen, is heated by the storage medium in tank 38 and is delivered through a conduit 40 to an outlet 41 in manifold system 35 where it passes across heater 24 and through an apertured container 42. The heating gas is exhausted from manifold system 35 through a conduit 44 by a conventional air pump or blower 46 run at a constant multiple of the engine speed. Blower 46 returns the air through a conduit 48 to tank 38. Thus blower 46, manifold system 35 and conduits 40, 44 and 48 comprise means for transferring heating gas from tank 38 to heater 24 at a substantially constant rate for a given engine speed.

As previously explained, the performance characteristics, such as power and efficiency, of a Stirling engine vary with the engine energy input and with the pressure of the working gas in addition to the engine speed. In prior Stirling engines performance has been controlled by varying the working gas pressure and the engine speed for a fixed heater temperature. Such engines are generally directly fired and the heater temperature is controlled by regulating the supply of fuel to the burner. However, as mentioned above, the transfer rate of heating gas to engine heater 24 is controlled to be substantially constant for a given engine speed and thermal energy storage tank temperature. Thus, the engine performance characteristics may be controlled by varying the working gas pressure.

FIGURE 1 shows the gas pressure control system for engine 10. A high pressure gas storage tank 50 is provided to store the working gas and is connected to engine 10 by gas transfer means as will now be described. Supply conduits 52 and 54 interconnect storage tank 50 and engine cooler 26. Buffer space 28 is connected to storage tank 50 by supply conduits 52 and 56. A supply or fill valve 58 is located in conduit 52 to control the transfer of working gas from tank 50 to the engine. Check valves 60 and 62 are provided to prevent the backflow of working gas to storage tank 50. Working gas may be exhausted or dumped from the engine through conduits 64, 66 and 68 to an accumulator 70. Working gas is drawn from the accumulator through a conduit 72 by a conventional gas compressor 74 which compresses the working gas and exhausts it through a conduit 76 to storage tank 50. A dump valve 78 is located in conduit 68 to control the dumping of working gas from the engine, while check valves 80 and 82 are provided to prevent the backflow of working gas to the engine.

Thus accumulator 70, compressor 74, storage tank 50 and conduits 72 and 76 comprise working gas storage means. Conduits 52, 54, 56 and check valves 60 and 62 comprise means for supplying working gas to the engine, while conduits 64, 66, 68 and check valves 80 and 82 comprise means for exhausting working gas from the engine.

Since engine power is proportional to the product of engine speed and torque, power can be controlled by the control of engine torque. A manual torque controller or throttle 84 is provided to operate valves 58 and 78 and may comprise any conventional mechanical or electrical control. To increase the engine torque, torque controller 84 is moved to an increased throttle position, to open valve 58 and supply working gas to the engine. To decrease the engine torque, torque controller 84 is moved to a decreased throttle position to open valve 78 and dump working gas to the storage tank. Thus the performance characteristics of engine 10 are regulated by torque controller 84 which operates fill valve 58 and dump valve 78 to selectively supply working gas to engine 10 from storage tank 50 and to dump working gas from the engine to the storage tank.

As previously noted, because of the constant rate of mass flow and temperature of heating gas supplied to heater 24, the temperature of heater 24 varies as a function of the working gas pressure at a given engine speed. FIGURE 5 shows a temperature-pressure graph for engine 10 at a given supply temperature and mass flow rate of heating gas and at a constant engine speed. The temperature-pressure line illustrates that the temperature of heater 24 varies inversely with working gas pressure. Thus the temperature of heater 24 is indicative of the working gas pressure and of engine power output and efficiency at a given engine speed.

FIGURE 4 is a temperature-performance graph for engine 10, showing how engine power output and efficiency vary with engine heater temperature for different engine speeds with corresponding mass flow rates of heating gas at a given supply temperature. Power curves for increasing constant engine speeds are designated $S_1$, $S_2$, $S_3$ and $S_4$. These curves indicate that engine power increases with temperature to a maximum point and thereafter decreases with an increase in heater temperature. Engine efficiency for all engine speeds is exemplified by a curve E which indicates that efficiency increases with heater temperature.

It is desirable to operate the engine so that full power is available at the "full throttle" position of torque controller 84. As shown in FIGURE 4, peak power occurs at nearly the same temperature for all engine speeds. This temperature is denoted $T_{min}$, or the temperature below which the engine should not be operated, since below this temperature both power and efficiency decrease. An arbitrary upper temperature limit $T_{max}$ is also imposed on the engine. $T_{max}$ is the highest temperature at which heater 24 may be operated without deterioration or destruction. Thus the optimum temperature range for the engine is between a predetermined $T_{min}$ and $T_{max}$.

This invention comprises means for utilizing the temperature of heater 24 to automatically regulate the engine working gas pressure and the operation of the thermal energy storage system to control the engine to operate within the indicated temperature range, as will now be described.

When it is desired to increase the engine torque, fill valve 58 is opened by torque controller 84 to transfer working gas from storage tank 50 to the engine. As the engine working gas pressure increases, the heater temperature drops until the maximum power point shown in FIGURE 4 is reached at $T_{min}$. Continued filling would cause the heater temperature to drop below $T_{min}$ and effect a drop in engine power. To prevent this a normally open solenoid-actuated main shut-off valve 86 is provided in conduit 52. Valve 86 is operated by temperature sensing means in the form of a temperature controller 88.

Figure 2:
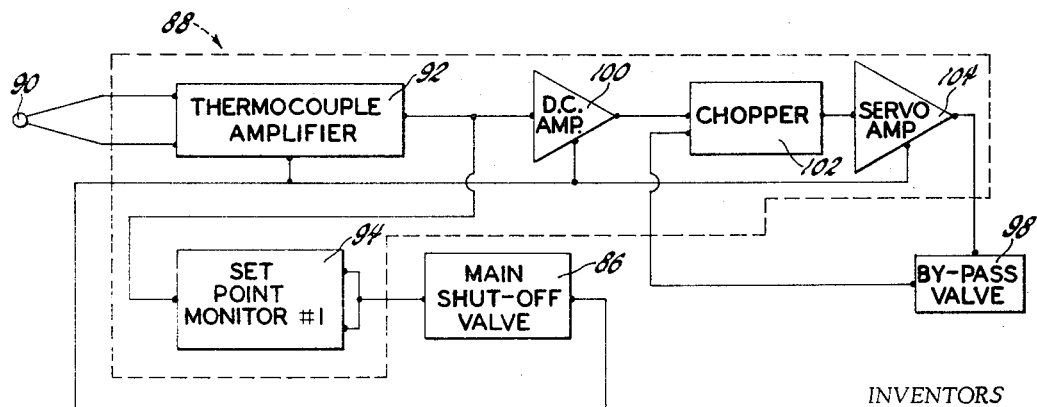
FIGURE 2 is a schematic diagram of a temperature controller according to this invention.

As shown in FIGURE 2, the temperature controller 88 includes a thermocouple 90 which measures the temperature of the working gas in one of the tubes 30 in engine heater 24. The temperature signal is amplified through a thermocouple amplifier 92 and transmitted to a first set point monitor 94 which controls the actuation of valve 86. Thus when the temperature of heater 24 drops to $T_{min}$, valve 86 is automatically closed to shut off the supply of working gas to the engine through conduit 52 and thereby maintain maximum power output of the engine. Conversely, a rise in heater temperature above $T_{min}$ will cause valve 86 to open again.

When it is desired to decrease the engine torque, torque controller 84 is actuated to open dump valve 78 to dump working gas to the accumulator 70. As working gas is dumped from the engine, the heater temperature will rise until $T_{max}$ is reached. Further dumping would cause the temperature of heater 24 to exceed $T_{max}$, resulting in damage to the heater. This may be prevented by stopping the flow of heating gas from tank 38 to the engine heater 24.

As shown in FIGURE 1, a bypass conduit 96, having less fluid resistance than conduit 48, is provided to shunt the heating gas in a closed circuit and thus starve heater 24. Conduit 96 includes a servomotor-actuated bypass valve 98 controlled by temperature controller 88. Referring again to FIGURE 2, when $T_{max}$ is sensed by thermocouple 90, the signal is transmitted from the thermocouple amplifier 92 through a D.C. amplifier 100 and a chopper 102 to a servo-motor amplifier 104 which controls valve 98. Thus when $T_{max}$ is sensed, valve 98 is opened to permit the circulation of heating gas through conduits 48 and 96 to starve heater 24. When the heater temperature drops below $T_{max}$, valve 98 will close and heating gas will again flow to heater 24.

Figure 3:
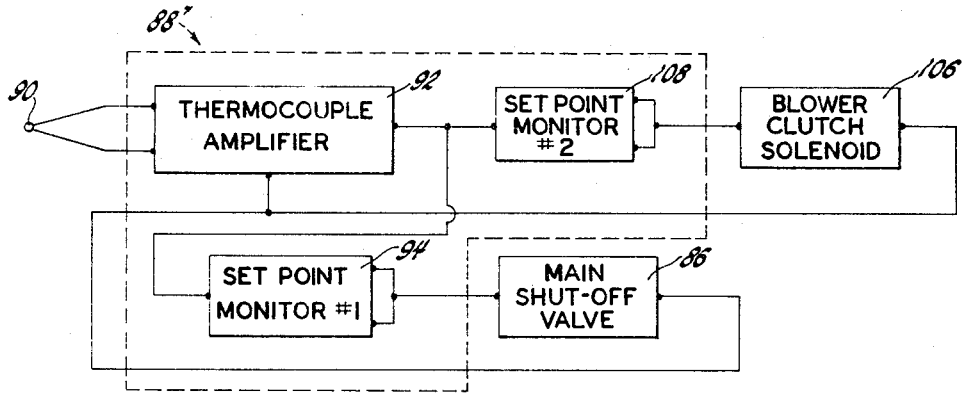
FIGURE 3 is an alternative embodiment of the temperative controller shown in FIGURE 2.

Another embodiment 88' of the temperature controller is shown in FIGURE 3. In this embodiment, conduit 96 and valve 98 are deleted and the blower 46 is provided with a conventional solenoid actuated clutch controlled by a solenoid 106. The sensed heater temperature signal is transmitted from thermocouple amplifier 92 to a second set point monitor 108 which controls solenoid 106. A sensed $T_{max}$ will actuate solenoid 106 to declutch blower 46 to stop the flow of heating gas from tank 38 to heater 24. When the temperature of heater 24 drops below $T_{max}$, temperature controller 88 will actuate clutch solenoid 106 to reclutch blower 46 and resume circulation of heating gas to the engine heater. The temperature controller may obviously take many other forms, although the illustrated embodiments are preferred.

Referring now to FIGURE 1, under conditions of minimum torque requirement, dump valve 78 will dump working gas to accumulator 70 at such a high rate that the capacity of the accumulator may be momentarily exceeded. Further regulating means are provided to permit control of the engine at this instant when working gas cannot be dumped from the engine.

A conduit 110 interconnects the engine cooler 26 and the buffer space 28. Located in the conduit 110 is a modulating valve 112, which is actuated simultaneously with fill valve 58 and dump valve 78 by torque controller 84. Conduit 110 also includes a normally closed solenoid-actuated bypass control valve 114. This valve is actuated by a conventional pressure sensitive control device, not shown, in accumulator 70. Thus, when a predetermined maximum pressure is reached in accumulator 70, the signal is transmitted to valve 114 which opens to permit control of the engine by power controller 84 through the modulation of engine working gas pressure by valve 112.

Thus the control system according to this invention provides means for regulating a Stirling engine to operate in a desired temperature range to assure optimum performance of the engine and includes temperature and pressure responsive controls. While only a preferred embodiment of this invention is shown and described, many modifications thereof are contemplated within the scope of this invention.

We claim:
1. A closed cycle hot gas engine having a working space adapted to contain a working gas, said engine comprising
   heating means for supplying thermal energy to the working gas,
   gas storage means,
   gas transfer means connecting with the engine working space and the gas storage means and adapted to supply gas from the gas storage means to the working space and to exhaust gas from the working space and
   engine control means including first regulating means actuable in response to a predetermined low temperature of the heating means to limit the supply of gas to the engine working chamber from the gas storage means.

2. A hot gas engine as defined in claim 1 wherein the engine control means include second regulating means actuable in response to a predetermined high temperature of the heating means to regulate the supply of thermal energy to the engine working gas.

3. A hot gas engine as defined in claim 2 wherein the engine control means include temperature sensing means for sensing the temperature of the heating means, said sensing means being connected with both said first and second regulating means and adapted to actuate said first regulating means in response to a predetermined low temperature of the heating means and to actuate said second regulating means in response to a predetermined high temperature of the heating means.

4. A hot gas engine as defined in claim 3 wherein said heating means include
   a heating exchanger for heating the engine working gas,
   thermal energy storage means and
   means for transferring thermal energy from the thermal energy storage means to the heat exchanger,
   said temperature sensing means being adapted to sense the temperature of the heat exchanger.

5. A closed cycle hot gas engine including a working space, adapted to contain a working gas, and a buffer space, said engine comprising
   heating means for supplying thermal energy to the working gas,
   gas storage means,
   gas transfer means connecting with the engine working and buffer spaces and the gas storage means and adapted to supply gas from the gas storage means to the working and buffer spaces and to exhaust gas from the working and buffer spaces,
   gas bypass means interconnecting the working and buffer spaces for transferring gas therebetween,
   first engine control means including first regulating means actuable in response to a predetermined low temperature of the heating means to limit the supply of gas from the gas storage means to the working and buffer spaces of the engine and
   second engine control means responsive to gas pressure in the gas storage means to regulate the transfer of gas between the working and buffer spaces.

6. A hot gas engine as defined in claim 5 wherein the gas transfer means are arranged to exhaust gas from the working and buffer spaces to the gas storage means and the second engine control means are responsive to a rise in pressure in the gas storage means above a predetermined pressure to permit the transfer of gas between the working and buffer spaces through the gas bypass means.

7. A hot gas engine as defined in claim 6 wherein the first engine control means include second regulating means actuable by a predetermined high temperature of the heating means to regulate the supply of thermal energy to the engine working gas.

8. A hot gas engine as defined in claim 7 wherein the heating means include
   a heat exchanger for heating the engine working gas,
   thermal energy storage means and means for transferring thermal energy from the thermal energy storage means to the heat exchanger and the engine control means include temperature sensing means for sensing the temperature of the heat exchanger, said temperature sensing means being connected with said first and second regulating means and being responsive to a predetermined low temperature in said heat exchanger to actuate said first regulating means and responsive to a predetermined high temperature in said heat exchanger to actuate said second regulating means.

References Cited

UNITED STATES PATENTS

| | | | |
|---|---|---|---|
| 2,643,509 | 6/1953 | Van Heeckeren et al. | 60—24 |
| 2,664,698 | 1/1954 | Van De Poll et al. | 60—24 |

FOREIGN PATENTS

| | | |
|---|---|---|
| 123,729 | 1/1949 | Sweden. |

MARTIN P. SCHWADRON, *Primary Examiner.*

C. B. DORITY, *Assistant Examiner.*